United States Patent
Rodrigues et al.

(10) Patent No.: US 8,562,864 B2
(45) Date of Patent: Oct. 22, 2013

(54) ASPHALT MIXTURE

(75) Inventors: Catherine Rodrigues, Petit Couronne (FR); Chantal Soubigou, Petit Couronne (FR)

(73) Assignee: Shell Oil Company, Houston, TX (US)

( * ) Notice: Subject to any disclaimer, the term of this patent is extended or adjusted under 35 U.S.C. 154(b) by 325 days.

(21) Appl. No.: 13/000,392

(22) PCT Filed: Jun. 23, 2009

(86) PCT No.: PCT/EP2009/057798
§ 371 (c)(1),
(2), (4) Date: Feb. 24, 2011

(87) PCT Pub. No.: WO2009/156389
PCT Pub. Date: Dec. 30, 2009

(65) Prior Publication Data
US 2011/0140045 A1    Jun. 16, 2011

(30) Foreign Application Priority Data

Jun. 24, 2008 (EP) .................................... 08290604

(51) Int. Cl.
*C09K 11/02* (2006.01)
*C09D 4/00* (2006.01)

(52) U.S. Cl.
USPC .................... 252/301.36; 106/284.03; 524/59

(58) Field of Classification Search
USPC .................. 252/301.36, 301.16, 301.4 R; 106/281.1, 284.02, 284.03; 524/59
See application file for complete search history.

(56) References Cited

U.S. PATENT DOCUMENTS

| 4,479,827 A | * | 10/1984 | Ward .......................... 106/269 |
| 4,629,754 A | | 12/1986 | Syrier et al. .................. 524/394 |
| 2007/0096058 A1 | | 5/2007 | Hirata et al. ............... 252/301.4 |

FOREIGN PATENT DOCUMENTS

| FR | 2811663 | | 1/2002 | ............... C09D 5/22 |
| FR | 2811663 A1 | * | 1/2002 | |
| JP | 62021904 A | * | 1/1987 | |
| WO | WO9002226 | | 3/1990 | ............... E01C 7/35 |
| WO | WO 9002226 A1 | * | 3/1990 | |
| WO | WO9218573 | | 10/1992 | ............... C09D 5/22 |
| WO | WO9311302 | | 6/1993 | ............... E01C 7/35 |
| WO | WO9510663 | | 4/1995 | ............... E01C 7/35 |
| WO | WO 2009019158 A2 | * | 2/2009 | |

OTHER PUBLICATIONS

FR2811663 description translation.*
FR2811663 claims translation.*

* cited by examiner

*Primary Examiner* — Emily Le
*Assistant Examiner* — Lynne Edmondson
(74) *Attorney, Agent, or Firm* — Charles W. Stewart

(57) ABSTRACT

A phosphorescent asphalt mixture comprising a binder, aggregate and a phosphorescent compound is disclosed. The phosphorescent compound has formula $MAl_2O_4$, wherein M is chosen from Sr, Ba and Ca, and wherein the phosphorescent compound has been doped with at least one rare earth element.

18 Claims, No Drawings

ASPHALT MIXTURE

PRIORITY CLAIM

The present application claims priority of European Patent Application No. 08290604.1 filed Jun. 24, 2008.

FIELD OF THE INVENTION

The invention relates to an asphalt mixture that is suitably used to prepare asphalt pavements.

BACKGROUND OF THE INVENTION

Road surfaces are typically made from asphalt, which is a mixture of a binder, such as bitumen, and aggregate. Many attempts have been made to provide a luminescent road surface that emits light, thereby reducing the need for street lights and potentially increasing safety for road users. WO 92/18573 discloses a binder for asphalt comprising a hydrocarbon component that is fluorescent in ultraviolet light. WO 93/11302 discloses a process wherein phosphorescent plastics or resins are added to conventional bituminous paving. WO 95/10663 discloses a process wherein fluorescent material is mixed with cement and sand, and formed into granules, and the granules can be incorporated into a road surface.

The present inventors have sought to provide road surfaces that exhibit luminescence.

SUMMARY OF THE INVENTION

Accordingly, the present invention provides a phosphorescent asphalt mixture comprising a binder, aggregate and a phosphorescent compound, wherein the phosphorescent compound has formula $MAl_2O_4$, wherein M is chosen from Sr, Ba and Ca, and wherein the phosphorescent compound has been doped with at least one rare earth element.

The present invention further provides a process of preparing an asphalt mixture according to the invention comprising steps of
(a) mixing the binder with the aggregate; and
(b) mixing the phosphorescent compound with the binder and the aggregate,
wherein steps (a) and (b) are simultaneous, or step (b) is after step (a).

The inventors have developed a process whereby phosphorescent compounds of formula $MAl_2O_4$ (M is Sr, Ba and/or Ca) that have been doped with at least one rare earth element, can be incorporated into asphalt mixture, thereby providing an asphalt mixture and asphalt pavements that exhibits phosphorescence. The phosphorescent compound is mixed with the binder and the aggregate, either after the binder and aggregate have been mixed or whilst the binder and aggregate are being mixed. If the phosphorescent compound is mixed with the binder before the aggregate is added, the resulting asphalt mixture is not phosphorescent.

For most pavements, the binder is bitumen, a viscous liquid or a solid consisting essentially of hydrocarbons and their derivatives. However, in recent years synthetic binders have also been used. Synthetic binders, such as Shell's Mexphalte C® possess similar rheological and mechanical properties to the bituminous binders typically used in road applications. The synthetic binders are typically clear, so they are readily pigmented and are used to obtain coloured asphalt mixture. In this description, the term "binder" covers both bituminous materials and synthetic materials having similar rheological and mechanical properties.

DETAILED DESCRIPTION OF THE INVENTION

Asphalts mixtures comprise binder and aggregate, in particular filler, sand and stones. There are many different types of asphalts available and their characteristics can vary quite significantly. The design of asphalts for paving application is largely a matter of selecting and proportioning materials to obtain the desired properties in the finished construction. The design of the asphalt mixture is typically based on the grading of aggregates and asphalt mixtures are usually classified into dense graded, gap graded and open graded. The asphalt mixture of the invention may fall into any of these categories.

The amount of binder in the asphalt mixture of the present invention will vary depending on the application for which the asphalt is to be used. However, the asphalt mixture used in the present invention preferably comprises in the range of from 1 to 20 wt % of the binder, more preferably in the range of from 2 to 10 wt %, and most preferably in the range from 3 to 7 wt %, based on total weight of asphalt.

The binder in the asphalt mixture may be a bituminous binder or may be a synthetic binder having similar rheological and mechanical properties to a bituminous binder. The penetration at 25° C. of the binder (as measured according to EN 1426) is preferably between 10, and 350, more preferably between 10 and 250. The softening point of the binder (as measured according to EN 1427) is preferably between 30 and 70° C., more preferably between 35 and 55° C.

In one embodiment of the invention, the binder in the asphalt mixture is a clear synthetic binder. Clear synthetic binders are described for example in U.S. Pat. No. 4,629,754.

In another embodiment of the invention, the binder in the asphalt mixture is a bituminous binder. Bituminous binders are commonly used because they are inexpensive and typically have suitable mechanical properties. Examples of bituminous binders that may be conveniently used in the present invention include distillation or "straight run" bitumen, precipitation bitumen, e.g. propane bitumen, oxidised or blown bitumen, naphthenic bitumen or mixtures thereof. The bituminous binder may be prepared by blending a bitumen with a flux oil, e.g. an aromatic, napthenic or paraffinic flux oil.

The binder in the asphalt mixture may comprise a polymer. Preferred polymers are thermoplastic elastomers or elastomers, for example styrenic block copolymers, olefinic copolymers, polyurethane and polyether-polyester copolymers. The binder may comprise a mixture of more than one polymer. The amount of polymer in the binder is preferably from 0.5 to 15 wt %, based upon the weight of the binder, preferably from 1 to 7 wt %.

The binder in the asphalt mixture may comprise further additives, e.g. softening agents such as wax or penetration index boosters such as waxes, polyphosphoric acid and ethylene polymers.

The phosphorescent compound has formula $MAl_2O_4$, wherein M is chosen from Sr, Ba and Ca, and has been doped with at least one rare earth element. Preferably the phosphorescent compound is strontium aluminate doped with at least one rare earth element. Preferably the phosphorescent compound is doped with europium and optionally with additional rare earth elements. More preferably the phosphorescent compound is doped with europium and dysprosium, or europium and lanthanum. Most preferably the phosphorescent compound is strontium aluminate doped with europium and dysprosium. Suitable compounds are disclosed in U.S. 2007 096058.

The amount of phosphorescent compound in the asphalt mixture is preferably from 0.1 to 10 wt %, based upon the weight of the asphalt mixture, more preferably from 0.5 to 8 wt %. The preferred amount is a compromise between cost (the phosphorescent compound is likely to be the most costly component in the asphalt mixture) and obtaining sufficient phosphorescence.

The present invention further provides a phosphorescent asphalt pavement prepared from an asphalt mixture according to the invention.

The asphalt mixture of the invention may be prepared by a process comprising steps of
(a) mixing the binder with the aggregate; and
(b) mixing the phosphorescent compound with the binder and the aggregate,
wherein steps (a) and (b) are simultaneous, or step (b) is after step (a). Suitable mixing techniques are known to the skilled person. The mixing is preferably carried out above the softening point of the binder, more preferably above 120° C. The phosphorescent compound is mixed with the binder and the aggregate, either after the binder and aggregate have been mixed or whilst the binder and aggregate are being mixed. If the phosphorescent compound is mixed with the binder before the aggregate is added, the resulting asphalt mixture is not phosphorescent.

The asphalt mixture can be used to form an asphalt pavement using conventional pavement-laying processes. Asphalt pavement provided using asphalt mixture of the invention exhibits phosphorescence; light is emitted after the pavement has been exposed to light.

EXAMPLES

The invention will now be described by reference to examples which are not intended to be limiting of the invention.

Example 1

An asphalt mixture was prepared by mixing 40 parts coarse aggregate (2/6 Rouillac), 52 parts fine aggregate (0/2 Rouillac), 2 parts filler (Meac), 6 parts clear synthetic binder (Mexphalte C® from shell) and 1 part phosphorescent powder consisting of $SrAl_2O_4$ doped with Eu and Dy (BLO-8 from Chimiray).

Exposing the asphalt mixture to light for 90 minutes provided 15 minutes phosphorescence in the dark.

Example 2

Example 1 was repeated except that 3 parts of phosphorescent powder were used instead of 1 part of phosphorescent powder.

Exposing the asphalt mixture to light for 90 minutes provided 15 minutes phosphorescence in the dark.

Example 3

Example 1 was repeated except that 5 parts of phosphorescent powder were used instead of 1 part of phosphorescent powder.

Exposing the asphalt mixture to light for 90 minutes provided 20 minutes phosphorescence in the dark.

Example 4

Example 3 was repeated except that 6 parts of bituminous binder (penetration grade 160/200) was used instead of 6 parts of synthetic binder. Exposing the asphalt mixture to light for 90 minutes provided less than 15 minutes phosphorescence in the dark. Exposing the asphalt mixture to light for 300 minutes provided 15 minutes phosphorescence in the dark.

Example 5

Example 4 was repeated except that 7 parts of phosphorescent powder were used instead of 5 parts of phosphorescent powder.

Exposing the asphalt mixture to light for 90 minutes provided less than 15 minutes phosphorescence in the dark. Exposing the asphalt mixture to light for 300 minutes provided 15 minutes phosphorescence in the dark.

Comparative Example 1

Phosphorescent powder consisting of $SrAl_2O_4$ doped with Eu and Dy (BLO-8 from Chimiray) was mixed with clear synthetic binder (Mexphalte C® from Shell) in a 4:1 ratio. The resulting binder did not exhibit phosphorescence. 6 parts of the resulting binder (consisting of synthetic binder and phosphorescent powder) was mixed with 40 parts coarse aggregate (2/6 Rouillac), 52 parts fine aggregate (0/2 Rouillac) and 2 parts filler (Meac). The resulting asphalt mix did not exhibit phosphorescence.

That which is claimed is:

1. A phosphorescent asphalt mixture comprising a binder, aggregate and a phosphorescent compound, wherein the phosphorescent compound has a formula of $MAl_2O_4$, wherein M is chosen from Sr, Ba and Ca, and wherein the phosphorescent compound has been doped with at least one rare earth element.

2. An asphalt mixture according to claim 1, wherein the binder is a clear synthetic binder.

3. An asphalt mixture according to claim 1, wherein the binder is a bituminous binder.

4. An asphalt mixture according to claim 3, wherein the phosphorescent compound is strontium aluminate doped with at least one rare earth element.

5. An asphalt mixture according to claim 4, wherein the phosphorescent compound is doped with europium and optionally with additional rare earth elements.

6. An asphalt mixture according to claim 5, wherein the amount of phosphorescent compound in the asphalt mixture is from 0.1 to 10 wt %, based upon the weight of the asphalt mixture.

7. A process for preparing an asphalt mixture, wherein said process comprises the steps of:
   (a) mixing a binder with an aggregate to form a mixture; and
   (b) mixing a phosphorescent compound with the mixture, wherein steps (a) and (b) are simultaneous, or step (b) is after step (a) to thereby form the asphalt mixture, wherein said phosphorescent compound has a formula of $MAl_2O_4$, wherein M is chosen from Sr, Ba and Ca, and wherein the phosphorescent compound has been doped with at least one rare earth element.

8. A process according to claim 7, wherein said binder is a bituminous binder.

9. A process according to claim 8, wherein said phosphorescent compound is strontium aluminate doped with at least one rare earth element.

10. A process according to claim 9, wherein said phosphorescent compound is doped with europium.

11. A process according to claim 9, wherein the amount of said phosphorescent compound in said asphalt mixture is in the range of from 0.1 to 10 wt %, based upon the weight of the asphalt mixture.

12. A process according to claim 7, wherein said binder is a clear synthetic binder.

13. A process according to claim 12, wherein said phosphorescent compound is strontium aluminate doped with at least one rare earth element.

14. A process according to claim 13, wherein said phosphorescent compound is doped with europium.

15. A process according to claim 14, wherein the amount of said phosphorescent compound in said asphalt mixture is in the range of from 0.1 to 10 wt %, based upon the weight of the asphalt mixture.

16. An asphalt mixture according to claim 2, wherein said phosphorescent compound is strontium aluminate doped with at least one rare earth element.

17. An asphalt mixture according to claim 16, wherein said phosphorescent compound is doped with europium.

18. An asphalt mixture according to claim 17, wherein the amount of said phosphorescent compound in said asphalt mixture is in the range of from 0.1 to 10 wt %, based upon the weight of the asphalt mixture.

* * * * *